US012580861B2

(12) United States Patent
Smith

(10) Patent No.: US 12,580,861 B2
(45) Date of Patent: Mar. 17, 2026

(54) METHOD AND SYSTEM FOR BENCHMARKING DATA CONNECTIONS BASED ON CONGESTION CONTROL

(71) Applicant: Ookla, LLC, New York, NY (US)

(72) Inventor: Brennen Smith, Seattle, WA (US)

(73) Assignee: Ookla, LLC, New York, NY (US)

( * ) Notice: Subject to any disclaimer, the term of this patent is extended or adjusted under 35 U.S.C. 154(b) by 134 days.

(21) Appl. No.: 18/365,861

(22) Filed: Aug. 4, 2023

(65) Prior Publication Data

US 2025/0047599 A1     Feb. 6, 2025

(51) Int. Cl.
| | |
|---|---|
| *H04L 47/12* | (2022.01) |
| *H04L 41/0896* | (2022.01) |
| *H04L 43/0864* | (2022.01) |
| *H04L 43/50* | (2022.01) |

(52) U.S. Cl.
CPC .......... *H04L 47/12* (2013.01); *H04L 41/0896* (2013.01); *H04L 43/0864* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2005/0100014 A1 | 5/2005 | Brown et al. | |
| 2005/0213586 A1* | 9/2005 | Cyganski | H04L 47/28 |
| | | | 370/395.41 |

| | | | |
|---|---|---|---|
| 2021/0306223 A1 | 9/2021 | Papaloukopoulos et al. | |
| 2023/0300671 A1* | 9/2023 | Jian | H04L 47/12 |
| | | | 370/229 |
| 2024/0163212 A1* | 5/2024 | Sze | H04L 41/0896 |

FOREIGN PATENT DOCUMENTS

| | | | | |
|---|---|---|---|---|
| CN | 114666831 A | 6/2022 | | |
| EP | 4161141 A1 * | 4/2023 | .......... | H04B 17/336 |
| KR | 20070060622 A * | 6/2007 | .......... | H04L 47/193 |

OTHER PUBLICATIONS

International Search Report and the Written Opinion of the International Searching Authority issued for PCT Patent Application No. PCT/US2024/037189, mailed on Oct. 18, 2024, 13 pages.
"Measuring Internet Speed Current Challenges and Future Recommendations"; Feamster, N. and Livingood, J.; Communications of the ACM; Dec. 2020; vol. 63, No. 12; pp. 72-80.
"Design and Implementation of Web-based Speed Test Analysis Tool Kit"; Yang, R., et al.; Mar. 22, 2022; pp. 1-14.

* cited by examiner

*Primary Examiner* — Natisha D Cox
(74) *Attorney, Agent, or Firm* — Aikin & Gallant, LLP

(57) ABSTRACT

Methods and systems are described for benchmarking a data connection based on congestion control. In one embodiment, a request is received by a first device to perform a performance test of a first data connection between the first device and a second device. The first device transmits, via the first data connection and to the second device, test data according to a congestion window. The first device receives feedback based on at least a portion of the transmitted test data, and determines a bandwidth or data transfer rate of the first data connection based on the feedback and on the congestion window. The first device transmits, over a second data connection, the bandwidth or data transfer rate to the second device for presentation by the device.

20 Claims, 5 Drawing Sheets

Process
40

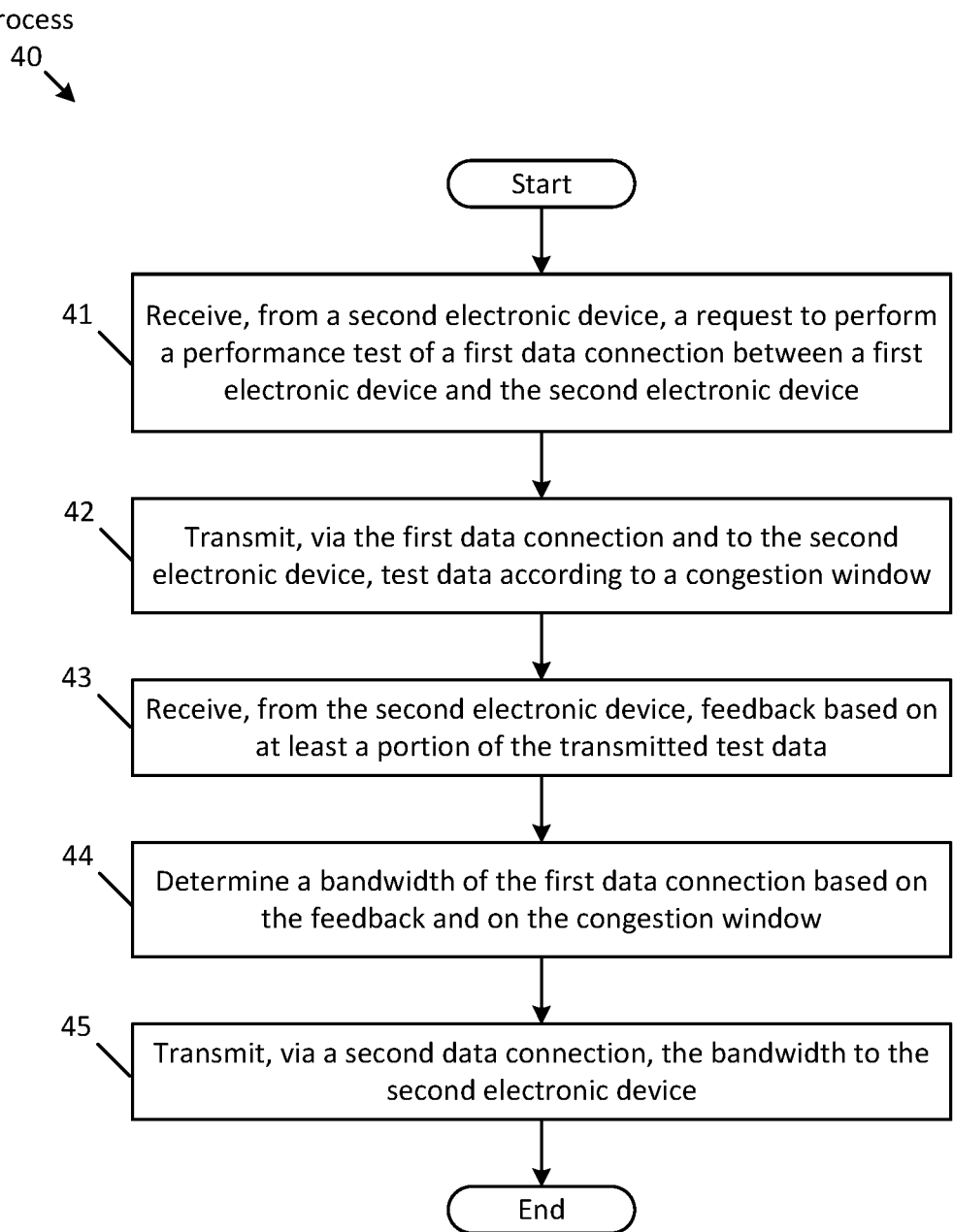

Start

41   Receive, from a second electronic device, a request to perform a performance test of a first data connection between a first electronic device and the second electronic device 42   Transmit, via the first data connection and to the second electronic device, test data according to a congestion window 43   Receive, from the second electronic device, feedback based on at least a portion of the transmitted test data 44   Determine a bandwidth of the first data connection based on the feedback and on the congestion window 45   Transmit, via a second data connection, the bandwidth to the second electronic device End

FIG. 4

METHOD AND SYSTEM FOR BENCHMARKING DATA CONNECTIONS BASED ON CONGESTION CONTROL

FIELD

An embodiment of the disclosure is related to methods and systems for efficient benchmarking of data connections between at least two devices based on network congestion control. Other embodiments are also described.

BACKGROUND

In recent years, with the proliferation of media streaming devices, such as computer tablets and smart phones, users stream a considerable amount of data. For example, to stream a 4K motion picture requires approximately nine gigabytes (GBs) for each hour of the motion picture. As a result, computing networks to which the media streaming devices connect to the Internet require a high bandwidth to handle the data, where bandwidth relates to a capacity at which a network can transmit data. In particular, bandwidth may be the maximum rate of data transfer (or maximum sending rate) that the underlying network may achieve without (or with minimal) loss. This is especially the case in which multiple computing devices are exchanging data across a given network.

SUMMARY

Bandwidth (e.g., Internet speed) of an Internet connection may be measured through the use of an Internet speed test. Conventional speed tests rely on large downloads to saturate a connection in order to measure how much data can be delivered without loss. For example, during a conventional test, a client device may request an Internet speed test server to transmit as much data as possible in order to load an Internet connection to its saturation point. For instance, the client device may instruct the server to transmit a specific amount of bytes (of a data file) to perform the test. Once the saturation point is deemed "reached" after the transmission of all of the requested data to the client device, or a timer expires, the client device determines and records the bandwidth by measuring the rate at which data is received or by determining how long it takes for the requested amount of data to be transmitted, for example. This relies on large data transfers on high bandwidth connections. Data connections, such as modern 5G connections, may consume over 1,000 megabytes (MBs) per test. For wireless carriers that sell customers tier packages based on data usage, a single Internet speed test over a wireless connection may consume upwards to 25% of a customer's monthly data allocation. Therefore, there is a need for an efficient performance test for benchmarking data connections between devices.

The instant disclosure is directed to a method and system for performing efficient benchmarking of data connections based on a congestion control algorithm that controls how many data packets may enter a network based on a size of a congestion window at any given time. For instance, a first electronic device (e.g., a sending device) may receive a request to perform a performance test of a first data connection between the first device and a second electronic device (e.g., a receiving device). For example, the receiving device may be a client device, such as a smartphone, while the sending device may be a remote server. In particular, the receiving device may establish a Transmission Control Protocol (TCP) connection or a Quick User Datagram Protocol (UDP) Internet Connection (QUIC) connection with the sending device. The sending device transmits, via the first data connection, data (e.g., test data or any type of data) according to a congestion window. In which case, a congestion control algorithm of the sending device may initiate congestion control, and begin transmitting data, where the algorithm may increase the congestion window, thereby increasing a sending rate of data over time.

The sending device may receive, from the receiving device, feedback based on a least a portion of the transmitted data. For instance, the feedback may include an indication of a packet loss event in which one or more transmitted data packets are lost and/or an acknowledgment that one or more data packets have been received by the receiving device. In one embodiment, the sending device may determine one or more characteristics of the first data connection based on the feedback. For example, the sending device may determine a round-trip time (RTT) of at least one of the data packets based on the acknowledgments, jitter of at least one of the data packets, or packet less of one or more data packets.

The sending device determines the bandwidth of the first data connection based on at least one of the feedback and on the congestion window. In particular, the sending device may determine whether a congestion window collapse event has occurred based on the feedback. In one embodiment, a congestion window collapse event may be any event that may cause the sending device to reduce the congestion window to avoid congestion when the sending device transmits future data to the receiving device. Such an event may include a packet loss event (e.g., due to too many data packets being transmitted over the network) or that a RTT of one or more data packets is above a threshold. In which case, the collapse event may include reducing the congestion window from a (e.g., recent) congestion window associated with the collapse event. As a result, the sending device may determine the bandwidth based on a congestion window, such as a previous congestion window before the (e.g., most recent) congestion window collapses, where the bandwidth may be based on a sending rate at which the sending device was transmitting data packets according to the previous congestion window.

The sending device may transmit, over another data connection, the bandwidth and/or the other determined characteristics associated with the first data connection, such as jitter, to the receiving device for presentation (e.g., through a display). In one embodiment, the sending device may cease transmitting the data and/or tear down the first data connection in response to determining the bandwidth. As a result of determining the bandwidth based on the congestion window collapsing, an accurate maximum sending rate may be determined with a minimal amount of data being transmitted between the sending device and the receiving device. For example, unlike conventional tests where a receiving device may request a sending device to transmit a test data file of a particular size, the instant disclosure may produce an effective performance result without having to transmit the entire test data file (e.g., only a fraction of the file), resulting in less data transmission. Furthermore, the instant disclosure allows for the performance test to be performed by the sending device, which in this case may be a remote server, as opposed to the client device.

According to another embodiment of the instant disclosure, is a method performed by one or more processors of the receiving device. In particular, the device transmits, to the sending device and via the first data connection, a request for the sending device to send test data for a performance test of the first data connection. In one embodiment, the receiving device may receive, via a user input device, a request to perform the test, and, responsive to receiving the request may establish, over a network, the first data connection with the sending device to perform the performance test. The receiving device may receive, from the sending device and via the first data connection, a portion of the requested test data, and may transmit via the first data connection, feedback based on the portion of the requested test data. The receiving device may receive, from the sending device and via a second data connection, a message that includes a data transfer rate of the first data connection based on the portion of the requested test data. In one embodiment, responsive to the transmission of the feedback, receiving, from the sending device and via the first data connection, an indication that the first data connection is to be torn down without having received a remainder of the requested test data. The receiving device may present the data transfer rate by displaying the rate on a display, for example.

The above summary does not include an exhaustive list of all embodiments of the present disclosure. It is contemplated that the disclosure includes all systems and methods that can be practiced from all suitable combinations of the various embodiments summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure in this disclosure are not necessarily to the same embodiment, and they mean at least one. Also, a given figure may be used to illustrate the features of more than one embodiment of the disclosure, and not all elements in the figure may be required for a given embodiment.

FIG. 4 is a flowchart of one embodiment of a process to determine a bandwidth of a data connection between two devices, according to some embodiments.

DETAILED DESCRIPTION

Several embodiments of the disclosure with reference to the appended drawings are now explained. Whenever embodiments of the embodiments described here are not explicitly defined, the scope of the disclosure is not limited only to the parts shown, which are meant merely for the purpose of illustration. Also, while numerous details are set forth, it is understood that some embodiments of the disclosure may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Figure 1:
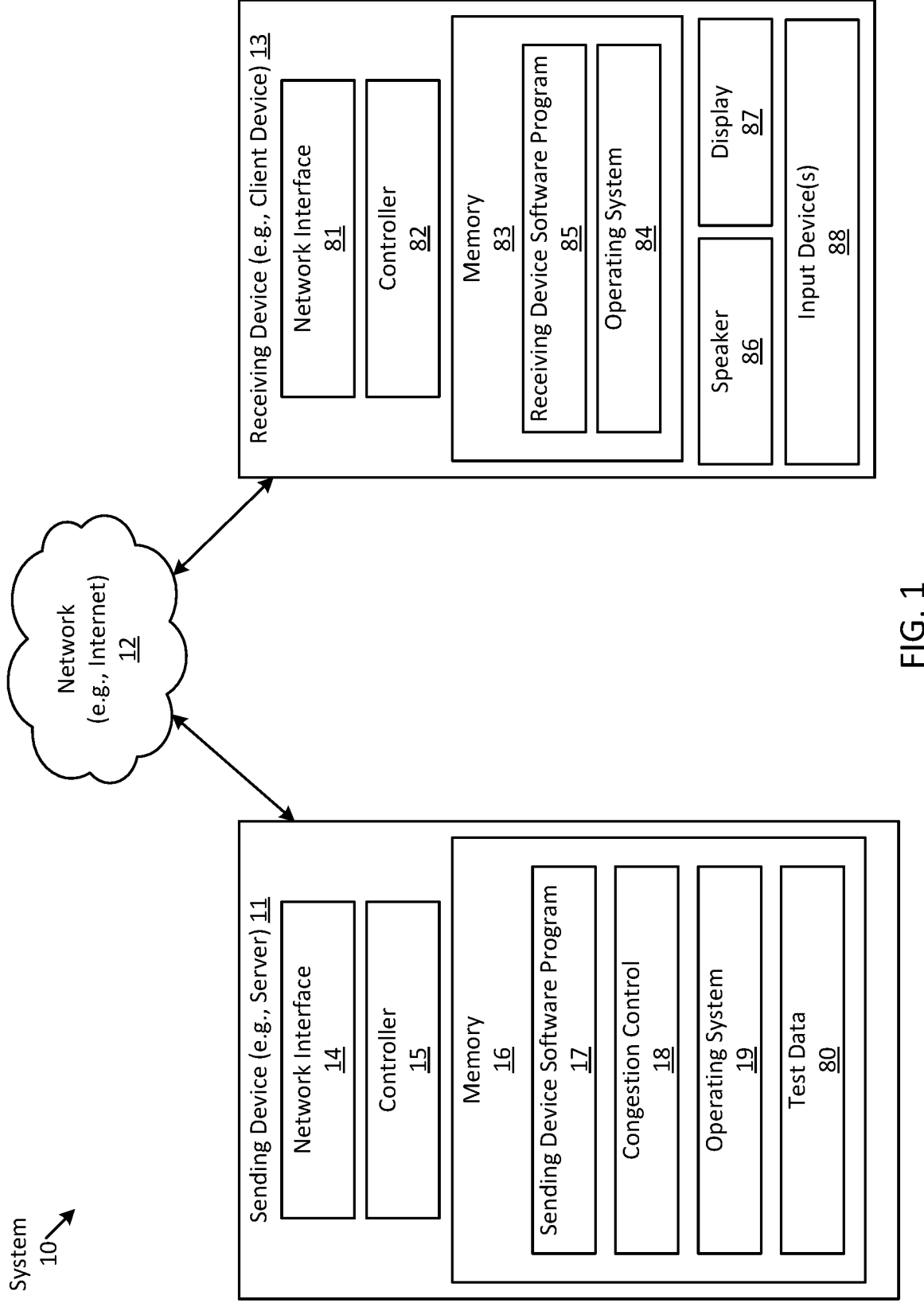
FIG. 1 is a block diagram illustrating a network benchmark system, according to some embodiments.

FIG. 1 is a block diagram illustrating a network benchmark system (hereafter referred to as "system") 10, according to some embodiments. The system 10 includes a receiving device 13, a sending device 11, and a network (e.g., Internet) 12. In one embodiment, the system may include more devices, such as having one or more sending devices, each of which may be configured to transmit at least some data to the receiving device. In another embodiment, the system 10 may include one or more additional devices that may be communicatively coupled with the receiving device 13.

The sending device 11 and the receiving device 13 may each be any type of electronic device that may be capable of establishing a data connection via one or more networks to another electronic device for exchanging data (e.g., as data packets) in order to perform a performance test upon the data connection. For example, the receiving device may be any type of client device, such as a tablet computer, a desktop computer, a mobile device (e.g., a smart phone), a media playback device, etc. In another embodiment, the receiving device may be any type of network device, such as a server, a router, a hub, etc. The sending device may be a network device such as a server.

In one embodiment, although the sending device is illustrated as being a server and the receiving device is illustrated as being a client device, either device may be a sending, or a receiving device based on the operations performed by either devices. For example, a "sending" device may be any type of device that may be tasked (e.g., by a receiving device) to send (e.g., test) data and to determine characteristics of a data connection established between the sending device and a receiving device. A "receiving" device may be any type of device that may receive the data and/or may send feedback to the sending device. As a result, the client device 13 may be a sending device that may perform one or more operations of a sending device described herein, and the server may be a receiving device, as described herein. More about the interchanging roles of the devices is described herein.

The receiving device 13 includes a network interface 81, a controller 82, memory 83, a speaker 86, a display 87, and an input device 88. In one embodiment, the receiving device may include more or less elements shown herein. For example, the receiving device may include one or more speakers, displays, and/or input devices. As another example, the device 13 may not include a speaker, a display, and/or an input device.

The network interface 81 provides an interface for the receiving device 13 to communicate with electronic devices, via the network 12, such as the sending device 11. For example, the network interface may be configured to establish a data connection (e.g., communication link) with (e.g., the network interface 14 of) the sending device 11, and once established exchange digital data, as described herein. In one aspect, the network 12 may be any type of computer network, such as a wide area network (WAN) (e.g., the Internet), a local area network (LAN), etc., through which the devices may exchange data between one another and/or may exchange data with one or more other electronic devices. In another aspect, the network may be a wireless network such as a wireless local area network (WLAN), a cellular network, etc., in order to exchange digital (e.g., test) data. With respect to the cellular network, the electronic device 13 may be configured to establish a wireless (e.g., cellular) call, in which the cellular network may include one or more cell towers, which may be part of a communication network (e.g., a 4G Long Term Evolution (LTE) network, a 5G network, etc.) that supports data transmission (and/or voice calls) for electronic devices, such as mobile devices (e.g., smartphones). In one embodiment, the receiving device 13 may be configured to communicate with one or more devices via the network 12 using any type of communication protocol, such as Transmission Control Protocol/ Internet Protocol (TCP/IP), Quick User Datagram Protocol (UDP) Internet Connections (QUIC), etc.

In another embodiment, the devices may be configured to wirelessly exchange data via other networks, such as a Wireless Personal Area Network (WPAN) connection. For instance, the sending device 13 may be configured to establish a wireless connection with another electronic device via a wireless communication protocol (e.g., BLUETOOTH protocol or any other wireless communication protocol). During the established wireless connection, the devices may exchange (e.g., transmit and receive) data packets (e.g., Internet Protocol (IP) packets) with the digital data.

The input device 88 may be any type of device that may be arranged to receive user input. For example, the device 88 may include a keyboard, one or more buttons, a mouse, etc. In another embodiment, the input device 88 may be a part of the display 87, whereby the display may be a touch-sensitive display screen that may be arranged to receive user input through one or more user touches.

The controller 82 may be (or include) a special-purpose processor (e.g., one or more processors) such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller may be configured to perform one or more performance test (e.g., benchmarking) operations, and/or networking operations, as described herein. More about the operations performed by the controller are described herein.

The memory 83 may be any type of non-transitory machine-readable storage medium, such as read-only memory, random-access memory, CD-ROMS, DVDs, magnetic tape, optical data storage devices, flash memory devices, and phase change memory. Although illustrated as being contained within the device 13, one or more components may be a part of separate electronic devices, such as the memory being a separate data storage device.

As shown, the memory 83 includes a (or one or more) receiving device software program 85 and an operating system 84. The operating system (OS) 84 may be a software component that is responsible for management and coordination of activities and the sharing of resources (e.g., controller resources, memory, etc.) of the device 13. In one embodiment, the OS acts as a host for application programs (e.g., program 85) that run on the device 13. In one embodiment, the OS provides an interface to a hardware layer (e.g., the controller, memory, etc.), and may include one or more software drivers that communicate with the hardware layer. For example, the drivers can receive, and process data packets received through the hardware layer from one or more other devices that are communicatively coupled to the device. In one embodiment, the OS may include (or be a part of) a kernel that provides an interface between the one or more programs that may be executed by (e.g., the controller 82) and the hardware layer.

The receiving device software program 85 may be any type of software application (that may include one or more instructions and), which when executed (e.g., by the controller 82) causes the receiving device 13 to communicate over the network 12 and perform one or more performance test operations. For example, the program may be capable of causing the receiving device (e.g., via the network interface 81) to exchange messages over the network 12 with the sending device 11 using any type of communication protocol (e.g., Hypertext Transfer Protocol (HTTP), HTTPS, etc.) using any type of communication protocol, such as TCP/IP, QUIC, etc. In one embodiment, the program 85 may be any application that may be capable of interacting with a web-based application, through which the performance test may be performed. In one embodiment, the software program 85 may be a performance test application, which when executed by establish a data connection with one or more devices, such as sending device 11, to determine one or more connection characteristics, such as bandwidth. In particular, the software program 85 may establish a TCP data connection (or QUIC connection) with the sending device 11, which when established may transmit a request to initiate a performance test, where the sending device may transmit data (e.g., test data 80), as described herein. In one embodiment, the program 85 may be configured to access a web browser (e.g., which may be hosted by the sending device 11), through which a performance test may be performed. In one embodiment, the program may be configured to display on the display 87 a graphical user interface (GUI), which may be arranged to present characteristics of a performance test, such as bandwidth.

The sending device 11 includes a network interface 14, a controller 15, and memory 16. The memory 16 includes a sending device software program 17, congestion control 18, an operating system 19, and test data 80. In one embodiment, the test data may include one or more test data files that may be used to perform a performance test. In another embodiment, the data may be specifically for use in a performance test. Although illustrated as being stored in memory of the sending device 11, the test data may be stored in a separate storage device, and retrieved, when necessary, by the sending device. In some embodiments, the test data may be any type of data. For example, the data used for the performance test may be any type of data that may be transmitted from the sending device 11 to device 13, such as user-requested data (e.g., multimedia content, etc.).

The sending device software program 17 may be any type of software program, which when executed by the controller 15 may communicate with one or more devices over a network and may perform one or more performance test operations, as described herein. For example, the software program 17 may be a performance test application (e.g., a web-based application), which when executed by the controller 15 may perform one or more data connection performance tests, as described herein.

The congestion control 18 may be any type of application (instructions) that perform congestion control and avoidance during a data connection between the sending device 11 and one or more receiving devices in order to provide data packet flow control. In one embodiment, the algorithm may be a part of (e.g., the kernel of the) operating system 19. For example, in the case of a TCP data connection, the congestion control 18 may at least partially be implemented in the transport layer by the kernel of the operating system. In another aspect, the congestion control 18 may at least partially be performed by a software application (e.g., congestion control algorithm) in the application layer. This may be the case when the connection is a QUIC data connection.

Congestion control 18 may include two primary stages in a life cycle of a data connection in which the sending device 11 may send data, such as the test data 80, to the receiving device 13-a congestion detection phase (or control), and a congestion avoidance phase. In one embodiment, each of the phases may be performed by the same algorithm or by different algorithms, one or more times during the life of a data connection. For example, the first phase may be performed by a HyStart algorithm, while the second phase may be performed by a CUBIC algorithm.

During the first phase, the congestion detection phase, a sending rate of data packets sent by the sending device 11 is rapidly ramped up. In particular, the congestion control may increase congestion windows (or congestion window sizes) that indicate an amount of data that may be transmitted at any given time. In particular, a congestion window may be a measure how much data (e.g., how many bytes) may be sent across a data connection without acknowledgement. The congestion control 18 may define a congestion window and may transmit data according to that window. The congestion control may increase the congestion window every round-trip time (RTT), e.g., when one or more acknowledgments of data that was previously sent during a prior congestion window is received from the receiving device. This process may be repeated, e.g., increasing the congestion window upon receiving acknowledgments from previously sent data, until a congestion window collapse event occurs. In one embodiment, a congestion window collapse event is any event that may cause congestion or data saturation (thereby adversely affecting communication) within the data connection. Such events may include a packet loss event, for example. Once a packet loss event occurs, it may be determined that the data connection has been saturated. More about congestion window collapse events are described herein. Thus, the congestion window size may be increased (e.g., doubled in size) as time goes on, until a congestion window collapse event occurs. In one embodiment, the congestion window before the collapse event occurs may indicate a maximum sending rate or pacing rate (e.g., bytes per second), whereby the sending device may send a maximum amount of data through the data connection without congestion (e.g., without data packets being lost).

Once the maximum sending rate is reached, where a congestion window collapse event occurs, the congestion control moves to the second phase, whereby the congestion control attempts to keep the sending rate just below the rate at which the congestion window collapse event occurred. In particular, the congestion control reduces the congestion window to a size prior to the congestion window associated with the collapse event, and once again begins to increase the congestion window until another collapse is detected. In one embodiment, this process may be repeated for a period of time or a life of the data connection. Thus, congestion control may be leveraged by data connections, such as TCP and QUIC, as bandwidth convergence mechanisms to determine how fast a device can send traffic without data packet loss.

In one aspect, the sending device software program 17 may utilize information from the congestion control 18 to perform a performance test of a data connection with the receiving device. As described herein, the sending device may transmit test data 80 by iteratively increasing the congestion window, and transmitting test data according to the increased congestion window to the receiving device until a congestion window collapse event of a most recent increased congestion window occurs. As described herein, the congestion window collapse event may result from a RTT associated with one or more data packets of the most recent increased congestion window being above a threshold, indicating that there is too long of a delay between when the packets were sent and when an acknowledgement may be received, or there is an indication of a packet loss event. In which case, the sending device software program 17 may determine one or more characteristics of the data connection based on (e.g., responsive to) the congestion window collapse event. For example, the software program 17 may poll the kernel of the operating system 19 to determine a sending rate at which the data is sent to the receiving device. In another embodiment, this information may be known (or determined) by the congestion control 18, which may include a congestion control algorithm running on top of the operating system. In one embodiment, the sending rate may be associated with (or correspond to) the bandwidth (or data transfer rate) of the data connection. More about the characteristics is described herein.

In another embodiment, the sending device software program 17 may determine characteristics, such as the bandwidth of the data connection, based on information of the data connection. For instance, the software program 17 may determine a previous congestion window from the most recent increased congestion window that is associated with the collapse event and a RTT associated with the previous congestion window, where this information may be retrieved from the congestion control (and/or from the kernel of the operating system 19). The software program may determine the bandwidth or data transfer rate may be as follows:

$$Data\ Transfer\ Rate = \frac{Congestion\ Window}{RTT}$$

Where the congestion window may be the previous congestion window before the collapse event and the RTT may be associated with that window. More about how the software program uses congestion control to determine the bandwidth is described herein.

Figure 2A:
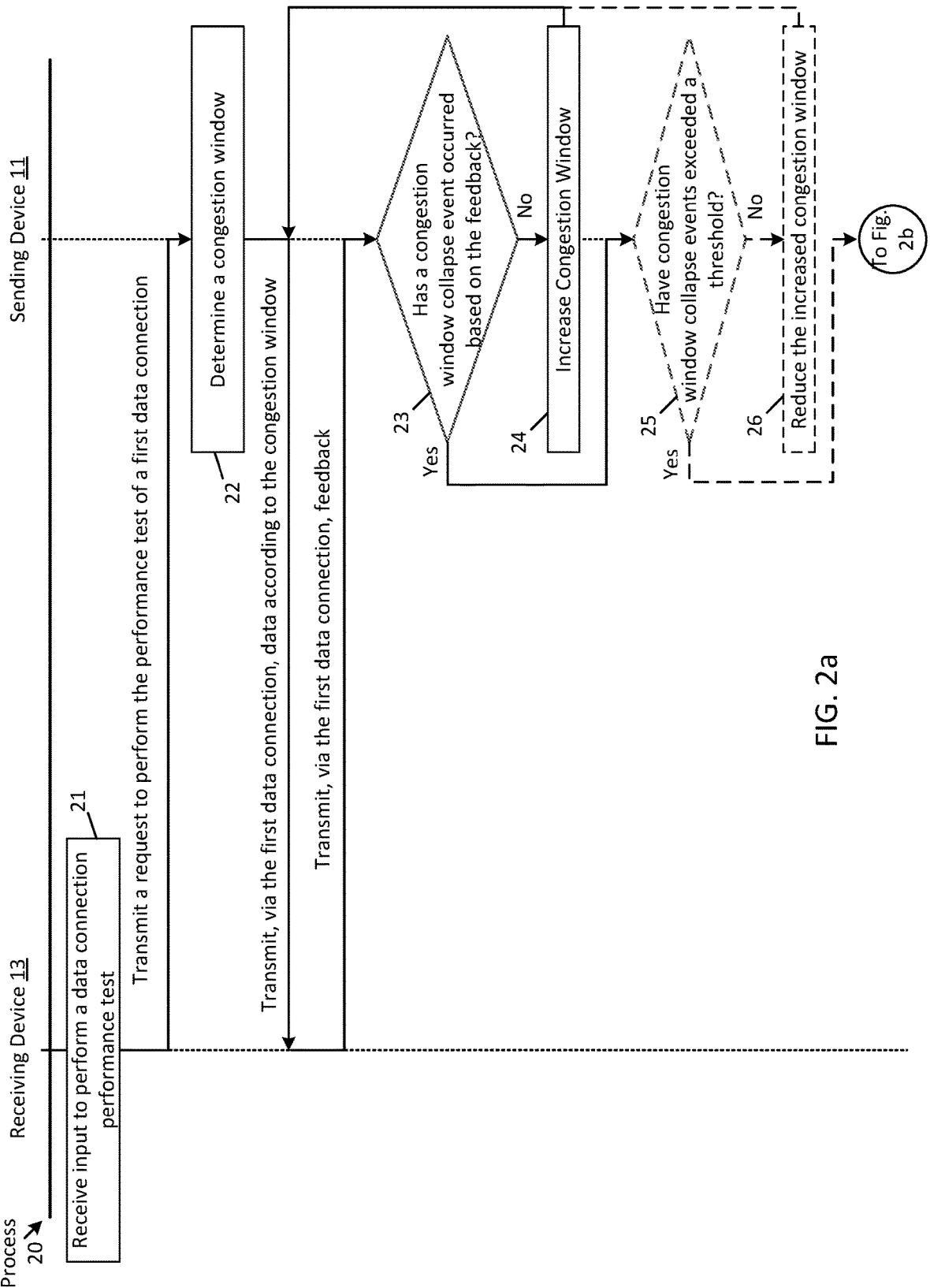
FIGS. 2a and 2b illustrate a signal diagram of a process performed by the network benchmark system for benchmarking a data connection between a sending device and a receiving device, according to some embodiments.
Figure 2B:
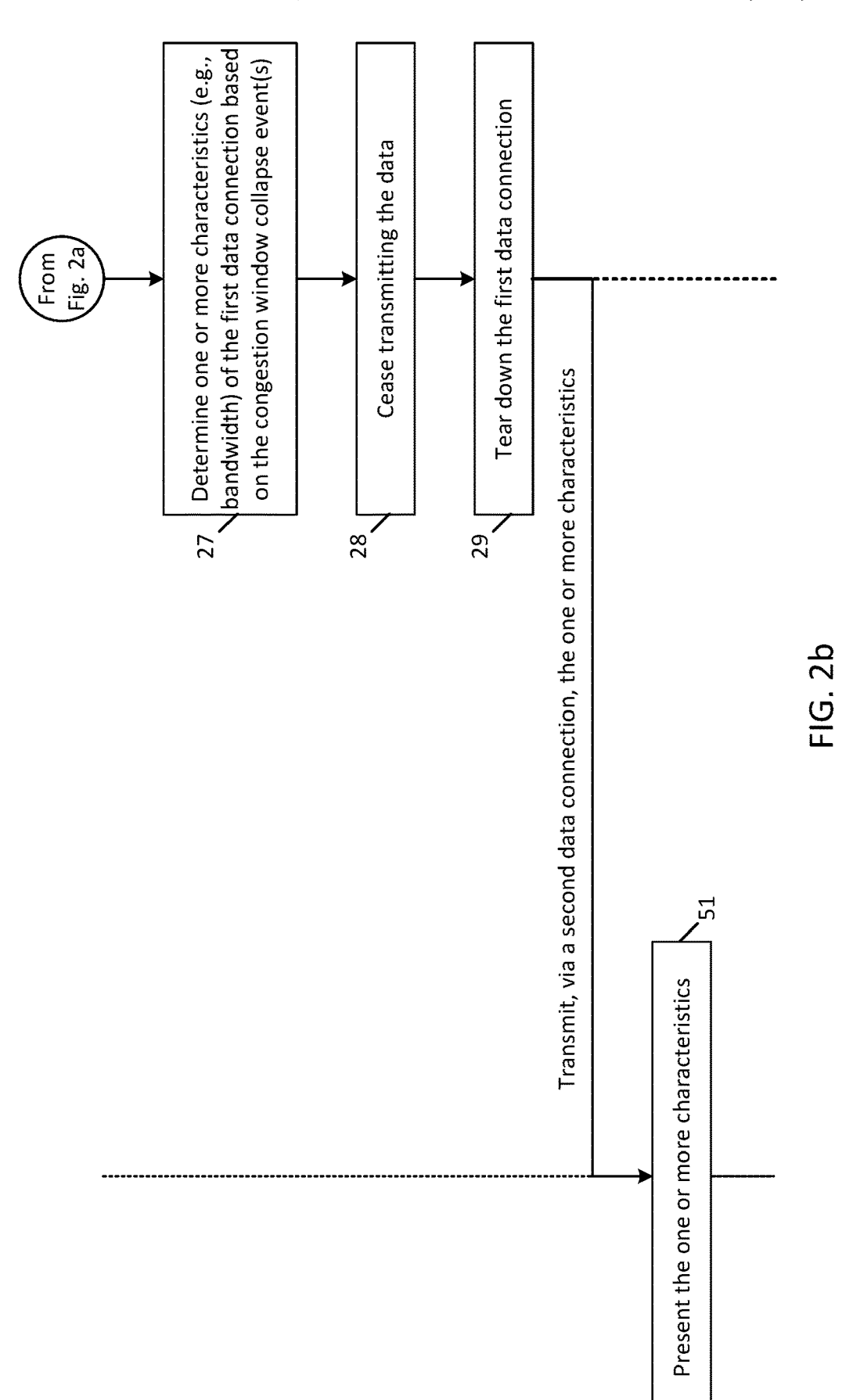

FIGS. 2a and 2b illustrate a signal diagram of a process 20 performed by the network benchmark system 10 for benchmarking a data connection between the sending device 11 and the receiving device 13, according to some embodiments. In particular, at least some of the operations described herein may be performed by either of the devices. For example, at least some operations may be performed by (e.g., the receiving device software program 85 that may be executed by) the controller 82 of the receiving device and/or at least some operations may be performed by (e.g., the sending device software program 17 and/or the congestion control 18 that may be executed by) the controller 15 of the sending device 11.

Turning to FIG. 2a, the process 20 begins by the controller 82 of the receiving device 13 receiving input to perform a data connection performance test (at block 21). In particular, the request may be a user-request that may be received by the receiving device software program 85 via an input device 88. For example, the software program may be configured to display a graphical user interface (GUI) on the display 87 that may include one or more user interface (UI) items, which may be user selectable through the input device. In which case, the GUI may include a UI item for initiating a performance test, where the UI may be user-selected (e.g., by selecting the item on the display, which may be a touch-sensitive display screen, as described herein).

The controller 82 causes the receiving device 13 to transmit a request to perform the performance test of a first data connection to the sending device 13. For example, the request may be a message using any type of communication protocol, such as HTTPS that may be transmitted over an existing data connection (e.g., a TCP connection, a QUIC connection, etc.) that may be established with the sending device 11. In one embodiment, the message may include instructions for the sending device to initiate one or more performance tests to benchmark the existing data connection. For example, the message may request for data (e.g., a particular data file) of a particular size (e.g., a certain number of bytes). In another embodiment, if an existing data connection is not already established, the receiving device may initiate and create the first data connection with the sending device 11 in order for the sending device to maximizing a sending rate of data, as described herein. Once established, the receiving device 13 may transmit the performance test request to the sending device 11.

The sending device 11 receives, from the receiving device 13, the request to perform the performance test of the first data connection. In one embodiment, in response to the request, the sending device may determine what data and/or how much data is to be transmitted to the receiving device. For example, the request may indicate a request for the test data 80, and an amount of data that is to be transmitted, as described herein. In particular, the request may indicate that a data file (e.g., of a particular size) of the test data 80 is to be transmitted to the receiving device.

In one embodiment, the (e.g., controller 15 may perform) congestion control 18 to initiate and control the flow of transmitted data to the receiving device 13 over the first data connection. For example, the controller 15 may perform at least some of the operations described in blocks 22, 24, and 26 and/or decision blocks 23 and 25 during the first and second phases of congestion control, as described herein. In particular, the controller 15 determines a congestion window (CWND) of a particular size (at block 22). In particular, the controller 15 may determine an initial (or starting) congestion window for transmitting a small amount of data (e.g., test data 80) as one or more data packets (e.g., IP packets). In one embodiment, the initial congestion window may be predefined. The controller 15 may cause the sending device 11 to transmit, via the first data connection, the data (e.g., requested by the receiving device) according to the determined congestion window.

As described herein, the request received from the receiving device 13 may indicate that a file is to be transmitted for the requested performance test. In which case, the controller 15 of the sending device may determine that a (e.g., test) data file is to be transmitted to the receiving device for the performance test (e.g., based on the request). In particular, the request may indicate that one or more files of the test data 80 are to be transmitted across the first data connection. The controller may determine a portion of the data file that is to be transmitted based on the determined congestion window. In particular, the congestion window may indicate a particular amount of data is to be transmitted, and in response the controller may partition out that much data from the data file for encapsulation into one or more data packets for transmission.

The receiving device 13 may receive at least some of the transmitted data via the first data connection, and may transmit, via the first data connection feedback based on the received data to the sending device. In one embodiment, the feedback may include one or more acknowledgements that one or more data packets transmitted by the sending device 11 have been received by the receiving device 13. In another embodiment, the feedback may include an indication of a packet loss event in which at least one transmitted data packet is lost. For example, the feedback may include one or more duplicate acknowledgements associated with one or more data packets, which may be indicative of packet loss. In another embodiment, the feedback may include only a subset of acknowledgements of (e.g., less acknowledgments than) the set of data packets that were sent by the sending device 11.

The sending device 11 may receive the feedback from the receiving device 13, and the controller 15 of the sending device 11 may determine whether a congestion window collapse event has occurred based on the feedback (at decision block 23). For example, the controller 15 may determine whether a packet loss event has occurred. In one embodiment, the controller 15 may make this determination based on whether one or more (e.g., three) duplicate acknowledgements have been received from the receiving device 13. In another embodiment, this determination may be made based on whether the feedback is omitting one or more acknowledgement of one or more data packets sent by the sending device. In another embodiment, a collapse event may be determined based on one or more acknowledgements that have taken too long to be received by the sending device. For example, the sending device may determine a round-trip time (RTT) based on a transmission of one or more data packets and a reception of one or more corresponding acknowledgement from the feedback. The controller 15 may determine whether there is too much delay in the transmission path, which may be indicative of congestion. In particular, the controller may determine that a congestion window collapse event has occurred when one or more RTTs associated with one or more data packets exceed a (e.g., predefined) threshold.

If not, the controller 15 proceeds to increase the congestion window (at block 24). The controller may (e.g., additive or multiplicative) increase the congestion window by one or more maximum segment sizes (MSSs). For example, when the congestion window is 1 MSS, the controller may add 1 MSS to the congestion window, effectively doubling the number of data packets that may be sent by the sending device 11. The controller 15 proceeds to cause the sending device to transmit the data according to the increased congestion window.

In one embodiment, the controller 15 may continue to iteratively, increase the congestion window and transmit, via the first data connection, data according to the increased congestion window until a congestion window collapse event of a most recent increased congestion window occurs. In which case, the controller 15 of the sending device may flood the data connection with the receiving device until either there is packet loss or there is sufficient delay within the data path, as described herein. In which case, the sending device may have saturated the first data connection with data, which may provide insight for a maximum transfer data rate from the sending device to the receiving device over the first data connection.

If there is a congestion window collapse event, at decision block 23, the controller 15 may proceed to determine whether there have been one or more congestion window collapse events that exceed a threshold (at decision block 25). As described herein, the congestion control 18 may perform at least some of these operations during both phases of the congestion control process in order to manage the flow of data. To do this, the control 18 may fluctuate between both phases (or perform one of the phases one or more times, such as the second phase) during the life of the data connection in order to achieve a maximum throughput. As a result, the sending device may have encountered one or more congestion window collapses during the transmission of the data to the receiving device 13. As a result, the controller 15 may determine whether a number of events have occurred that exceed a threshold. If not, the controller reduces the increased congestion window (e.g., the most recent increased congestion window associated with a most recent congestion window collapse event), and proceeds to transmit data according to the reduced congestion window. In which case, the controller may perform the second phase of the congestion control, where the congestion window is reduced, data is transmitted to the receiving device 13 according to the reduced congestion window, and then the window may be increased (at block 24) upon a determination of whether a congestion window collapse event has occurred for the reduced window. In one embodiment, the controller 15 may perform at least some of these congestion control operations until a number of detected congestion window collapse events have occurred. In which case, the process 20 may proceed to FIG. 2b.

In one embodiment, one or more operations described herein may be optional. In particular, operations of decision block 25 and block 26 may be optional, such that once a (e.g., first) congestion window collapse event has been detected, the controller 15 may proceed to FIG. 2b. Specifically, the controller 15 may perform the first phase of the congestion control algorithm, whereby the congestion window is increased until a congestion window collapse event occurs. Once the event is detected, however, the controller 15 may omit the operational operations (e.g., to reduce the increased congestion window side and to continue transmitting data), and proceed through the process 20, as described herein. This may reduce the amount of data that is to be transmitted across the first data connection.

Turning now to FIG. 2b, the controller 15 of the sending device determines one or more characteristics, such as bandwidth, of the first data connection based on the congestion window collapse event(s) (at block 27). In particular, the sending device may determine the characteristics based on a determination that the congestion window collapse event(s) have occurred. In particular, the controller 15 may determine characteristics, such as bandwidth, responsive to receiving an indication of the packet loss event or determining that one or more RTTs are above a threshold. For instance, as the sending device transmits one or more data packets according to a congestion window, the controller 15 may poll the (e.g., kernel of the) operating system 19 for socket information, such as the congestion window at or before the collapse event and a pacing (e.g., data transfer) rate that is the rate at which the kernel believes is a safe sending rate of bytes per second across the data connection without congestion. In particular, the controller may determine the rate at which data is sent to the receiving device based on (or associated with) a congestion window previous to the most recent congestion window associated with the congestion collapse event. In another embodiment, the controller 15 may determine other characteristics associated with the previous congestion window, such as a RTT of at least one of the data packets (e.g., which may be associated with the previous congestion window from the collapse event), jitter of one or more data packets, or packet loss of one or more data packets. In another embodiment, the controller may determine the amount of data that was transmitted to the receiving device.

In one embodiment, the controller 15 may determine the characteristics based on multiple congestion windows collapse events. As described herein, the controller 15 may perform congestion control until multiple congestion window collapse events occur (e.g., until the number of events exceed a threshold). In which case, the controller may determine characteristics associated with each (or at least some) of the events (e.g., polling socket information). In particular, the data may be polled during or associated with congestion windows prior to a window associated with a collapse event. As a result, the controller may determine characteristics based on socket information relating to at least some of the collapse events. For example, the controller may determine the bandwidth as an average (or a mean) of pacing rates polled from the kernel before at least some of the collapse events. Thus, the controller 15 may determine the characteristics based on information relating to each collapse, which may provide a better picture of the data connection between the devices.

The controller 15 ceases (e.g., causes the sending device to cease) to transmit the data (at block 28). In particular, the sending device may stop sending data across the first data connection once the characteristics are determined. In this way, the sending device 11 may have only sent a portion of the data (of a data file) requested by the receiving device 13 to perform the performance test. In which case, responsive to receiving the feedback, the sending device may cease to transmit a remainder of the data file that was requested by the receiving device via the first data connection and to the receiving device. As a result, the system 10 may use dramatically less (e.g., less than 10% of) data that would otherwise be used during a conventional performance test. The controller 15 may tear down the first data connection (at block 29). For example, when the devices are connected through a TCP connection, the sending device 13 may transmit a message across the connection (e.g., containing a "FIN"), which in response the receiving device 13 may transmit an acknowledgement, after which the connection may be terminated. In one embodiment, the controller may tear down the first data connection between the two devices in response to determining the one or more characteristics (e.g., the bandwidth) of the first data connection.

Thus, in response to the congestion window collapse event(s), the controller 15 of the sending device may be configured to determine the characteristics, cease transmitting the data, and tear down the connection. Although blocks 28 and 29 are illustrated as separate blocks, these operations may be performed together. In particular, the sending device 11 may cease transmitting the data by tearing down the first data connection. In which case, the sending device 11 may transmit a FIN message, as described herein, thereby stopping the transmission of the test data 80, as described herein. As a result, responsive to a transmission of the feedback, the receiving device may receive, from the sending device and via the first data connection, an indication that the first data connection is to be torn down (e.g., reception of the FIN message) without having received all of (e.g., a remainder of) the requested test data.

As described thus far, the controller 15 may determine whether a congestion window collapse event has occurred based on feedback from the receiving device. In one embodiment, the controller may determine whether a congestion window collapse event has occurred based on whether congestion control at the sending device has reduced the congestion window (e.g., at block 26). In particular, the congestion control algorithm, which may be performed by one or more software applications and/or by the kernel of the operating system 19, may perform one or more of the operations described herein to determine whether the congestion window is to be reduced due to a packet loss event, for example. The controller may poll the kernel, while data is transmitted to the receiving device, to determine whether the congestion window has been reduced. In response, the controller may determine that a congestion window collapse event has occurred, and may poll the kernel for one or more characteristics, as described herein. In particular, the controller may determine a pacing rate at which data was transmitted prior to the collapse, as described herein. This may be the case when the data connection is a TCP connection. In another embodiment, the controller may poll one or more software applications executing congestion control when the data connection is another type of connection, such as a QUIC connection.

The sending device 11 transmits, via a second data connection, the one or more determined characteristics. In particular, the sending device may transmit a message, received by the receiving device, which includes characteristics, such as a data transfer rate of the first data connection based on the portion of the requested test data. In one embodiment, the sending device 11 may store the characteristics, such as the pacing rate, and may deliver the characteristics to the receiving device out-of-band. For example, the sending device may establish another (e.g., TCP) data connection, and through which may transmit the characteristics. In one embodiment, the sending device may transmit the bandwidth (or pacing rate) through the data connection. In another embodiment, the sending device may transmit additional characteristics of the first data connection through the second data connection, such as one or more RTTs associated with the congestion windows, jitter, an indication of packet loss, a total amount of data that has been transmitted across the first data connection, etc.

In one embodiment, the sending device 11 may transmit the one or more characteristics through any type of electronic message. For example, the sending device may transmit the characteristics as an electronic message using any type of protocol, such as Simple Mail Transfer Protocol (SMTP), etc. In another embodiment, the characteristics may be transmitted as a push notification in the form of a message (e.g., SMS).

The receiving device 13 receives the one or more characteristics through the second data connection. The controller 82 presents the one or more characteristics (at block 51). For example, the receiving device software program 85 may display the characteristics within a GUI in the display 87. In particular, the controller may display the pacing rate as the bandwidth of the first data connection on which the performance test was performed. In another embodiment, the software program may output sound through the speaker 86 that includes an audible representation of the characteristics, such as output sound that includes "Your Internet Speed is 500 megabits per second".

As described herein, the congestion control 18 may be a part of the (e.g., kernel of the) operating system 19, or may be a software application. In one embodiment, the congestion control operations may be performed by the kernel when the data connection is a TCP connection, whereas at least some of the operations may be performed in the application layer when the data connection is another type of connection, such as QUIC connection. As a result, at least some of the operations, such as the determination of the bandwidth as described in block 27 may be performed by one or more software applications (e.g., a congestion control algorithm being executed on top of the operating system, for example) that are being executed by one or more processors of the sending device.

The process 20 described herein provides an accurate and efficient way for the sending device 11 to measure the bandwidth of the first data connection with the receiving device 13. Unlike conventional performance tests that are performed a receiving side, the instant disclosure provides an example of a performance test performed on the sending side. For conventional tests, a common concern with measuring on the sending side is that there is no knowledge if data has actually reached the receiving side, where data may end up being buffered in a buffer. This may especially be the case when an application instructs a transport layer to write data into a (e.g., TCP) socket and then transport the data asynchronously. The present disclosure, however, solves this problem by tracking the data sent through the use of the congestion control algorithm, e.g., which may be performed by the kernel of the sending device. Specifically, the congestion control algorithm may track acknowledgments for every segment (data packet) sent to the receiving device 13, and may constantly assess the rate at which the segments are being delivered to the final destination based on the feedback received from the receiving device. In which case, the sending device will not send more than the congestion window defined by the congestion control allows without receipt of an acknowledgment. As a result, the system 10 may perform an accurate performance test based on congestion control that relies on acknowledgment received form the receiving device, thereby minimizing (or eliminating) any effects of buffering.

Figure 3:
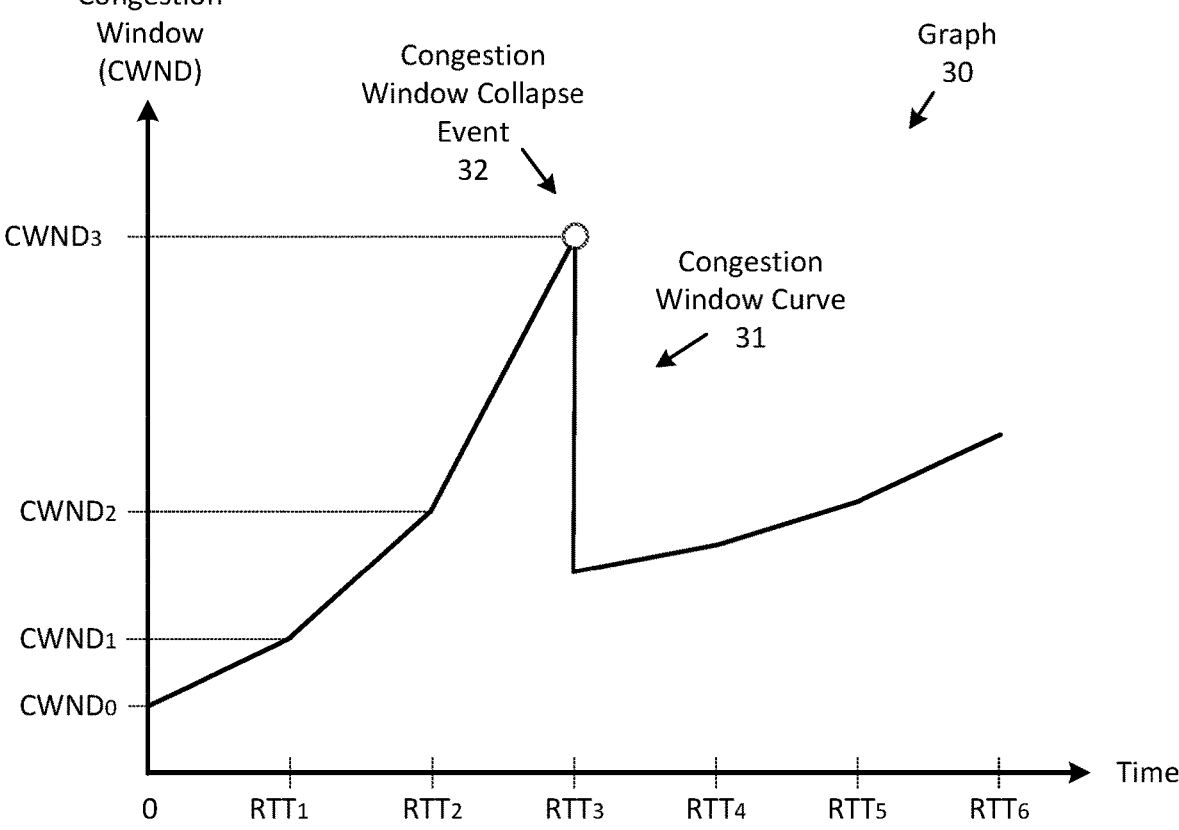
FIG. 3 shows a graph of a congestion window curve according to one embodiment.

FIG. 3 shows a graph 30 of a congestion window curve 31 according to one embodiment. The congestion window curve 31 represents the size of the congestion window with respect to time, which is illustrated as RTTs. In particular, this curve represents changes to the congestion window by the congestion control 18, while performing one or both congestion control phases. In one embodiment, this curve represents the window during at least some of the operations performed in blocks 22-26 of process 20, as described in FIG. 2a.

At time=0, the congestion control 18 determines and sets an initial congestion window (CWND$_0$), whereby the sending device 11 transmits one or more data packets of data according to the CWND$_0$. The congestion control waits to receive one or more acknowledgements for the one or more data packets from the receiving device 13, thereby indicating that there isn't a congestion control window collapse event. Upon receiving all (or at least some) of the acknowledgements, at RTT$_1$, the congestion control 18 increases the congestion window to CWND$_1$. As shown, this process (e.g., operational blocks 23 and 24 of process 20 in FIG. 2a) are repeated two additional times. In particular, the controller performs one or more congestion control algorithms to increase a congestion window that indicates a number of data packets for transmission, and transmits the data packets according to the increased window. Thus, the sending device begins to send data, where the sending rate of data increases (e.g., doubles) every round-trip time without congestion via increasing the congestion window. In one embodiment, this increase may be additive or multiplicative. In one embodiment, the increase may be exponential.

At $CWND_3$, however, the congestion control 18 detects a congestion window collapse event 32. In particular, the congestion control algorithm determines whether a congestion window collapse event of an increased congestion window has occurred based on feedback from the receiving device. For example, the sending device may receive feedback from the receiving device that is indicative of packet loss (e.g., duplicative acknowledgements), or the congestion control may determine that one or more RTTs of one or more received acknowledgments have significant delay (e.g., above a threshold). At this point, it may be assumed that the sending device has achieved the maximum sending rate of the connection (e.g., without any packet loss and/or unduly delay). In which case, the congestion window is reduced at $RTT_3$ in order to avoid congestion. From $RTT_3$ to $RTT_6$ the congestion control continues to increase the congestion window, until another congestion window collapse event is detected, whereby the congestion window may then again be reduced.

In one embodiment, the length (e.g., duration) of the curve 31 may be based on a number of congestion window collapse events are used by the controller 15 to measure the characteristics of the data connection. For example, in the case of measuring the characteristics until only one collapse event is detected, the curve may stop at $RTT_3$. At which point, the controller 15 may poll the congestion control 18 and/or the kernel of the sending device for information. For example, responsive to a determination that a congestion window collapse event has occurred, the congestion control algorithm may reduce the increased congestion window and/or may poll (e.g., the kernel of the sending device 11) to determine one or more characteristics associated with the congestion window prior to the detected collapse, which in this case would be $CWND_2$, such as a pacing rate of the data connection associated with that congestion window, $RTT_2$, etc., since $CWND_2$ is associated with the maximum amount of data that may be sent before a collapse event occurs. The sending device may store this information, immediately close (tear down) the data connection with the receiving device, and/or transmit the information to the receiving device 13, as described herein.

In the case, however, of proceeding past $RTT_3$, the controller 15 may poll the socket information, and may continue to increase the congestion control, as shown from $RTT_3$ to $RTT_6$ until another congestion window collapse event occurs. At which point, the controller 15 may determine (e.g., at decision block 25 of process 20 in FIG. 2*a*), whether a sufficient number of congestion window collapse events have occurred. If so, the controller may determine the characteristics of the data connection based on information associated with each (or prior to each) congestion window collapse event.

FIG. 4 is a flowchart of one embodiment of a process 40 to determine a bandwidth of a data connection between two devices, according to some embodiments. At least some of the operations may be performed by the system 10 to determine one or more characteristics, such as bandwidth, of a data connection between at least two devices. In particular, at least some of the operations may be performed by the controller 15 of the sending (e.g., first electronic) device 11. The process 40 begins by the controller 15 receiving, from a second electronic device (e.g., the receiving device 13) a request to perform a performance test of a first data connection (e.g., TCP or QUIC connection) between the first electronic device and the second electronic device (at block 41). The controller 15 transmits, via the first data connection and to the second electronic device, test data according to a congestion window (at block 42). In particular, the controller 15 may cause (e.g., through the network interface 14) the first electronic device to transmit the data.

The controller 15 receives (e.g., via the network interface 14), from the second electronic device, feedback based on at least a portion of the transmitted test data (at block 43). In particular, the receiving device may transmit the feedback through the first data connection. The controller 15 determines a bandwidth (and/or other characteristics) of the first data connection based on the feedback and on the congestion window (at block 44). For example, the controller 15 the feedback may include an acknowledgement that one or more data packets have been received by the receiving device, where a RTT may be determined from the acknowledgement. In which case, the controller may determine the bandwidth as a maximum transfer rate based on a difference between the congestion window and the RTT. In another embodiment, the controller may determine the bandwidth (e.g., as a pacing rate at which the sending device has transmitted data) by polling socket information, as described herein. The controller 15 may transmit, via a second data connection, the bandwidth to the second electronic device (at block 45). As described herein, the second electronic device may display the bandwidth on the display 87.

As described thus far, the performance test operations may be performed by the sending device in order to measure characteristics such as bandwidth of a data connection with a receiving device. In which case, from the receiving device's perspective, the bandwidth may represent an Internet download speed of the established data connection. As a result, the roles of the devices described herein, may be switched in order to determine an Internet upload speed of the established data connection with respect to the receiving device 13. For example, once the one or more characteristics of the first data connection are determined by the sending device and the transmission of the data stops, rather than tearing down the first data connection at block 29 in process 20, both devices may switch roles, thereby having device 13 send data to device 11 to measure the bandwidth of the first data connection. In which case, the system may determine the maximum data transfer rates between both devices, and may present the rates to a user of the client device, whereby the maximum data transfer rate determined by the server 11 (acting as the sending device) may be an Internet download speed of the data connection and the maximum data transfer rate determined by the client device 13 (acting as the sending device) may be an Internet upload speed of the data connection.

In another embodiment, to measure the Internet upload speed of the device 13, the devices may establish a brand-new data connection, and perform the operations described herein. For example, once the original data connection is torn down by device 11, device 13 may transmit a request to perform the performance test of another data connection. In which case, once the characteristics of the new data connection is measured, the device 13 may present at least some of the characteristics, as described herein. As a result, the system 10 may be capable of measuring an Internet download and upload speed for the device 13 with minimal amount of data exchanged with device 11.

As previously explained, an embodiment of the disclosure may be a non-transitory machine-readable medium (such as microelectronic memory) having stored thereon instructions, which program one or more data processing components (generically referred to here as a "processor") to perform at least some of the operations described herein. In other embodiments, some of these operations might be performed by specific hardware components that contain hardwired logic. Those operations might alternatively be performed by any combination of programmed data processing components and fixed hardwired circuit components.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the claim.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by one or more processors of a first electronic device, the method comprising:
receiving, from a second electronic device, a request to perform a performance test of a first data connection between the first electronic device and the second electronic device;
determining test data as a portion of a test data file based on a congestion window;
transmitting, via the first data connection and to the second electronic device, the test data;
receiving, from the second electronic device, feedback based on at least a portion of the transmitted test data;
determining a bandwidth of the first data connection based on the feedback and on the congestion window;
ceasing to transmit a remainder of the test data file; and
transmitting, via a second data connection, the bandwidth to the second electronic device.

2. The method of claim 1 further comprising determining one or more characteristics of the first data connection based on the feedback,
wherein the test data is transmitted as a plurality of data packets, and
wherein the one or more characteristics are transmitted to the second electronic device over the second data connection, wherein the one or more characteristics comprises a round-trip time of at least one of the plurality of data packets, jitter of the at least one of the plurality of data packets, or packet loss of one or more data packets.

3. The method of claim 1 further comprises, responsive to determining the bandwidth, tearing down the first data connection between the first electronic device and the second electronic device.

4. The method of claim 1, wherein the first data connection is a Transmission Control Protocol (TCP) connection.

5. The method of claim 1, wherein the first data connection is a Quick User Datagram Protocol (UDP) Internet Connections (QUIC) connection.

6. The method of claim 1, wherein the test data is transmitted as a plurality of data packets, wherein the feedback comprises:
an indication of a packet loss event in which at least one transmitted data packet is lost or
an acknowledgement that one or more data packets have been received by the second electronic device,
wherein the method further comprises determining a round-trip time (RTT) between a transmission of the one or more data packets and a reception of the acknowledgment.

7. The method of claim 6, wherein the bandwidth is determined responsive to receiving the indication of the packet loss event or determining that the RTT is above a threshold.

8. The method of claim 6,
wherein transmitting the test data comprises iteratively, increasing the congestion window, and transmitting, via the first data connection and to the second electronic device, the test data according to the increased congestion window until a congestion window collapse event of a most recent increased congestion window occurs in which the RTT associated with the most recent increased congestion window is above a threshold or the indication of a packet less event is received based on the feedback,
wherein the bandwidth is determined based on a previous congestion window from the most recent increased congestion window and the RTT associated with the previous congestion window.

9. The method of claim 1 further comprising determining that the test data file is to be transmitted to the second electronic device for the performance test, wherein;
transmission of the remainder of the test data file is ceased responsive to receiving the feedback.

10. The method of claim 1, wherein the first electronic device is a server, and the second electronic device is a client device.

11. A system, comprising:
at least one processor; and
memory having stored therein instructions which when executed by the at least one processor causes the system to:
receive, via a first data connection and from an electronic device, a request to perform a performance test of the first data connection,
transmit, via the first data connection and to the electronic device, a portion of test data as a plurality of data packets,
receive, via the first data connection and from the electronic device, feedback based on at least a portion of the transmitted plurality of data packets,
determine a data transfer rate of the first data connection based on the feedback and the test data, and
responsive to determining the data transfer rate,
cease transmitting the portion of the test data by tearing down the first data connection without transmitting a remainder of the test data, and
transmit, over a second data connection, the data transfer rate to the electronic device.

12. The system of claim 11, wherein the request comprises a request for the system to transmit all of the test data.

13. The system of claim 11, wherein the memory has further instructions to perform a congestion control algorithm to:

increase a congestion window that indicates a number of data packets for transmission, determine whether a congestion window collapse event of the increased congestion window has occurred based on the feedback, and responsive to a determination that the congestion window collapse event has occurred, reduce the increased congestion window, and determine the data transfer rate using the number of data packets of the congestion window.

14. The system of claim 13, wherein determining whether the congestion window collapse event has occurred comprises determining whether, based on the feedback, that a packet loss event has occurred, or a round-trip time (RTT) of one or more data packets is above a threshold.

15. The system of claim 11, wherein the memory has further instructions to determine one or more additional characteristics of the first data connection based on the feedback, wherein the one or more additional characteristics comprises a round-trip time of at least one data packet, jitter of the at least one data packet, or packet loss of one or more data packets.

16. The system of claim 11, wherein the first data connection is a Transmission Control Protocol (TCP) connection or a Quick User Datagram Protocol (UDP) Internet Connections (QUIC) connection.

17. A method performed by one or more processors of a receiving device, the method comprising:

transmitting, to a sending device and via a first data connection, a request for the sending device to send test data for a performance test of the first data connection;

receiving, from the sending device and via the first data connection, a portion of the test data;

transmitting, to the sending device and via the first data connection, feedback based on the portion of the test data;

receiving, from the sending device and via a second data connection, a message that includes a data transfer rate of the first data connection based on the portion of the test data; and presenting the data transfer rate.

18. The method of claim 17, wherein the request comprises a first request, wherein the method further comprises:

receiving, via a user input device, a second request to perform the performance test; and responsive to receiving the second request, establishing, over a network, the first data connection with the sending device to perform the performance test.

19. The method of claim 17 further comprising, responsive to a transmission of the feedback, receiving, from the sending device and via the first data connection, an indication that the first data connection is to be torn down without having received a remainder of the test data.

20. The method of claim 17, wherein the receiving device is a mobile device.

\* \* \* \* \*